(No Model.)
J. D. FRARY.
DISINTEGRATER AND STRAINER.
No. 343,809. Patented June 15, 1886.
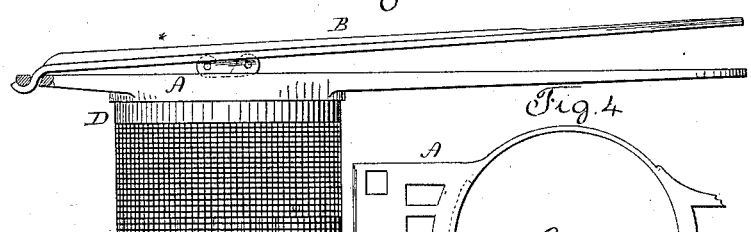
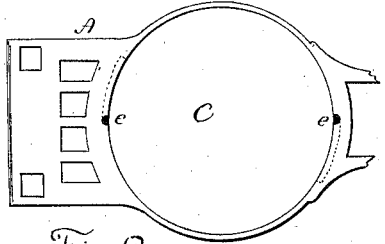
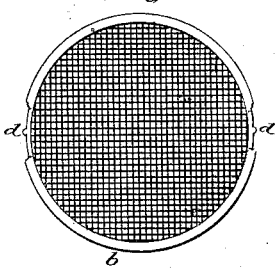
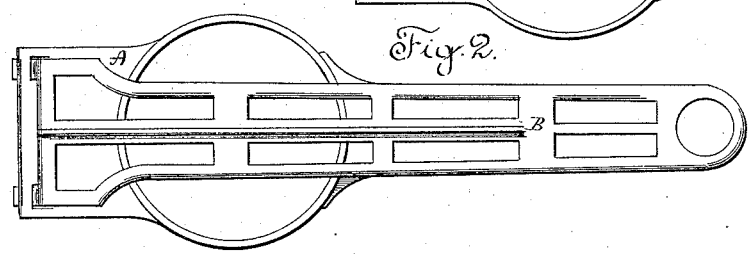
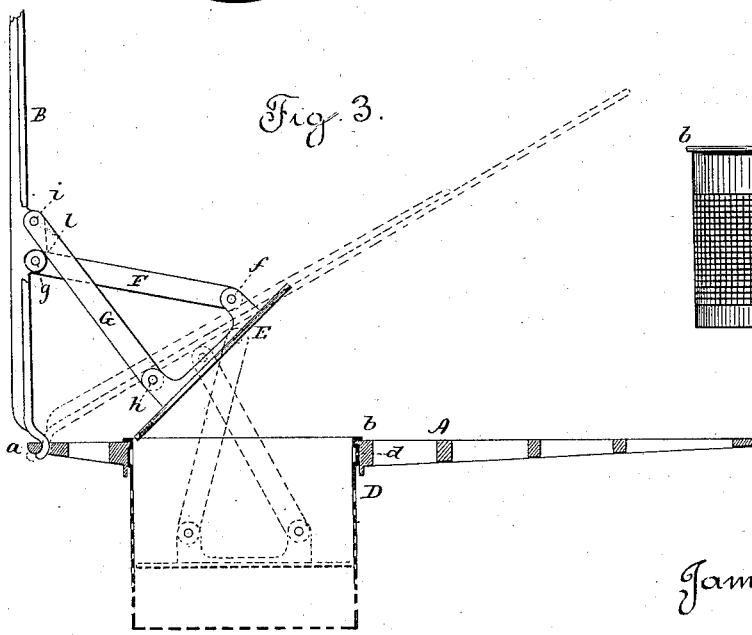
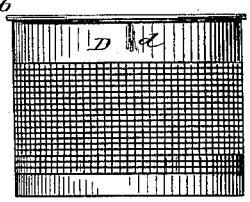
Witnesses.
J. H. Shumway
Fred C. Earle
James D. Frary
Inventor.
By Atty
N. PETERS, Photo-Lithographer, Washington, D. C.

UNITED STATES PATENT OFFICE.

JAMES D. FRARY, OF BRIDGEPORT, CONNECTICUT.

DISINTEGRATOR AND STRAINER.

SPECIFICATION forming part of Letters Patent No. 343,809, dated June 15, 1886.

Application filed October 26, 1885. Serial No. 181,004. (No model.)

*To all whom it may concern:*

Be it known that I, JAMES D. FRARY, of Bridgeport, in the county of Fairfield and State of Connecticut, have invented a new Improvement in Disintegrators and Strainers; and I do hereby declare the following, when taken in connection with the accompanying drawings and the letters of reference marked thereon, to be a full, clear, and exact description of the same, and which said drawings constitute part of this specification, and represent, in—

Figure 1, a side view of the disintegrator complete; Fig. 2, a top view of the same; Fig. 3, a sectional side view showing the apparatus as open for the reception of material to be acted upon; Fig. 4, a top view of a portion of the lever A, showing the recess to receive the cup; Fig. 5, a side view of the removable cup; Fig. 6, a top view of the cup, a portion of its flange broken away to show the interlocking lugs.

This invention relates to a device specially designed for culinary uses, the object being a simple and convenient apparatus for compressing fruits, vegetables, &c., for the purpose of disintegration or extracting juices; and the invention consists in a cup arranged in one lever, the said cup having a perforated bottom, and may be perforated upon its sides, combined with a second lever hung to the first at one side of the cup opposite the handle ends, and so that the levers may be separated or made to approach each other as upon a hinge, with a follower hung to the said other lever by a pair of links, so that in the vibratory movement of the said levers a reciprocating movement will be imparted to said follower within the said cup toward and from the bottom of the cup, and the follower be held in a plane substantially parallel with the bottom of the cup.

A represents one lever, and B the other, the two hinged together, as at $a$, and so that they may swing upon that hinge as a pivot for their vibratory movement, and so as to be separated, as seen in Fig. 3, or be brought nearly together, as seen in Fig. 1. Each lever terminates at its end opposite the hinge in a shape convenient for a handle. In one lever, A, an opening, C, is made, preferably circular, and at a short distance forward of the hinging-point of the levers.

D is the cup, which is made from suitable sheet metal, perforated upon its bottom, and preferably around its vertical sides. The cup is of substantially equal diameter from top to bottom, and is constructed with a flange, $b$, around its upper edge, to rest upon the upper side of the lever A, the cup itself being of such diameter as to pass freely through the opening C in the lever. The cup is also constructed with lugs $d$, to enter corresponding recesses, $e$, in the edge of the opening through the lever, and so that the cup set through the opening, the lugs $d$ will pass down through the recesses $e$, and then by turning the cup to one side will be interlocked with the lever, as seen in Fig. 3, but so that the cup may be readily removed should occasion require.

E is a follower of disk shape, and little less in diameter than the internal diameter of the cup. It is hung to the lever B by two links, F G, the links being in a plane parallel with the plane in which the levers move toward and from each other. The one link, F, is hung to the follower upon a pivot, $f$, near its front edge, and, extending to the lever B, is hung thereto upon a pivot, $g$. The other link, G, is hung by one end to the follower upon a pivot, $h$, near its rear edge. The link extending toward the lever B crosses the link F, and is hung to the lever B upon a pivot, $i$, forward of the pivot $g$, by which the other link, F, is secured.

On the lever B a stop, $l$, is arranged—may be the head of the pivot $g$—upon which the link G may bear when the lever B is raised into its opening position, as seen in Fig. 3, and so that the follower will rest in that position, as indicated in Fig. 3, and be in position to enter the cup, as the levers are brought toward the closed position. As the follower enters the cup, the cup itself forms a guide for the edges of the follower. The links F G, however, maintain it in a plane nearly parallel with the bottom of the cup throughout the movement of the lever, and so that the follower, in its movement into and from the cup, has substantially a reciprocating movement, in contradistinction to a vibratory movement—that is to say, by the link-connection between the lever B and the follower the vibratory movement of the lever is converted into a reciprocating movement for the follower; hence the pressure in the cup is substantially alike at all points. By making the cup removable from the lever I am enabled to interchange one cup for another, one having finer perforations than another, and so that different degrees of disintegration may be produced by different cups, hence adapting a single apparatus to various classes of work. The cup may, however, be made a permanent part of the lever A, the representation in Fig. 3 being considered as a permanent fixture between the cup and its lever.

From the foregoing it will be understood that I do not claim, broadly, a disintegrator or strainer consisting of a receiver having a perforated wall and adapted to receive the material to be acted upon, with a follower adapted to enter said receiver and force the material through the perforations in the receiver; but What I do claim is—

1. The combination of the two levers A B, hinged together at one end, the other end terminating in the form of a handle, a cup, D, carried by one of said levers, A, said cup having a perforated bottom, and a follower, E, hung to the other lever, B, by a pair of links, F G, the said links hung by one end to the said follower, and, crossing each other, hung by the opposite end to the said lever B, the said follower E adapted to enter and work in said cup in a plane substantially parallel with the bottom of the cup and substantially as described.

2. The combination of the two levers A B, hinged together at one end, the other end terminating in the form of a handle, the one lever, A, constructed with a recess, C, the removable cup D, adapted to set into said recess in the one lever, the bottom of said cup perforated, the follower E, adapted to enter said cup, and hung to the other lever, B, by the links F G, the said links arranged in a plane parallel with the path of movement of said levers, and hung by one end to the said follower at diametrically-opposite points, the said links crossing each other, their outer end hung to the said lever B, substantially as described.

3. The combination of the two levers A B, hinged together at one end, the other end terminating in the form of a handle, a cup, D, carried by one of said levers, A, said cup having a perforated bottom, and a follower, E, hung to the other lever, B, by a pair of links, F G, the said links hung by one end to the said follower, and, crossing each other, hung by the opposite end to the said lever B, and a stop, l, on the lever B, the said follower E adapted to enter and work in said cup in a plane substantially parallel with the bottom of the cup and substantially as described.

JAMES D. FRARY.

Witnesses:
JOHN E. EARLE,
FRED C. EARLE.